United States Patent [19]

Ritter, II et al.

[11] Patent Number: 4,492,722
[45] Date of Patent: Jan. 8, 1985

[54] PREPARATION OF GLASS-CERAMIC FIBERS

[75] Inventors: George W. Ritter, II, Newark; Leonard J. Adzima, Pickerington, both of Ohio

[73] Assignee: Owens-Corning Fiberglas Corporation, Toledo, Ohio

[21] Appl. No.: 517,106

[22] Filed: Jul. 25, 1983

[51] Int. Cl.³ .......................... B05D 3/02; C03C 17/00
[52] U.S. Cl. .................................... 427/226; 427/314; 428/392; 65/60.52
[58] Field of Search .............. 427/226, 314; 428/392; 65/60.52

[56] References Cited

U.S. PATENT DOCUMENTS 4,129,434  12/1978  Plumat ........................ 65/60.52

FOREIGN PATENT DOCUMENTS 0093922  8/1976  Japan ........................ 65/60.52
0022426  2/1979  Japan ........................ 65/60.52

*Primary Examiner*—John E. Kittle
*Assistant Examiner*—James J. Seidleck
*Attorney, Agent, or Firm*—Ronald C. Hudgens; Robert F. Rywalski; Philip R. Cloutier

[57] ABSTRACT

A method of depositing a coating consisting essentially of titanium dioxide from an organic solution onto glass in an effort to improve the modulus and temperature resistance of the glass.

7 Claims, No Drawings

PREPARATION OF GLASS-CERAMIC FIBERS

This invention relates to the preparation of glass ceramic fibers.

In one of its more specific aspects, this invention relates to controlled devitrification of glass fibers to produce glass-ceramic fibers.

BACKGROUND OF THE INVENTION

The method of preparing glass fibers is well known. Such fibers are used for a plurality of purposes such as reinforcements and the like.

Efforts are continuously being taken to improve such glass fibers, particularly as concerns improving modulus and temperature resistance. This invention is directed towards such improvements.

STATEMENT OF THE INVENTION

According to this invention, there is provided a method of treating glass which comprises contacting the glass with a titanium compound to deposit titanium on the surface of the glass and then heat-treating the glass fiber to a temperature within the range of from about 1700° to about 2100° F. for a period of time sufficient to devitrify the glass surface.

In one embodiment of the invention, the titanium compound is contained in an organic liquid.

In another embodiment of the invention, the glass is in the form of glass fibers which, having the titanium compound on their surfaces, are heated to a temperature within the range of from about 1700° F. to about 2100° F.

DESCRIPTION OF THE INVENTION

The method of this invention can be employed in the treatment of any glass, regardless of how formed. It is particularly suitable for employment with S-type glass fibers which can be formed in any manner. The glass will preferably be free of any surface coating. If the glass has been sized, it should be heated cleaned at 1200° to about 1500° F. for about fifteen minutes to remove the coating. By S-type glass is meant a low alkali, magnesia, alumino silicate glass. The following approximate composition is a typical S-type glass:

| | |
|---|---|
| $SiO_2$ | 64.5 |
| $Al_2O_3$ | 25.0 |
| MgO | 10.0 |
| $Na_2O$ | 0.22 |
| $FeO_3$ | 0.15 |
| CaO | 0.12 |
| $K_2O$ | 0.08 |
| $TiO_2$ | 0.07 |

The glass can be contacted with any suitable titanium compound which, after the subsequent heat treating step, leaves the titanium on the glass in the form of the oxide. Preferably, the glass will be treated with an organo-titanium compound as the solute dissolved in an organic solvent. Mixtures of organic compounds of other metals can also be contained in the solution, such metals being calcium, magnesium, aluminum and other metals associated with refractory compositions.

In the preferred embodiment of the invention, the glass will be treated with an organic solution consisting essentially of an organic solvent and a titanium-organic complex.

One particularly suitable material is commercially available as DuPont's Tyzor AA and is a 75 percent solution of titanium (acetylacetonate)-(i-propanolate) in which the titanium concentration is about 9.9 weight percent. Actually, any solution effective in depositing titanium oxide on the glass in an amount up to about 15 weight percent is satisfactory.

The titanium-containing solution can be applied to the glass in any suitable manner. Preferably, the glass is simply immersed in the solution at atmospheric conditions for a period of up to about 15 minutes.

After contact between the glass and the titanium-containing solution, the glass is dried and thereafter the glass is heat treated at a temperature within the range of from about 1700° to about 2100° F. for a period of up to about 3 hours.

In one embodiment of the invention, polyethyleneglycol can be added to the organo-titanium solution to minimize wicking during final drying.

The method of this invention is demonstrated by the following example.

EXAMPLE I

S-glass fibers were heat cleaned and contacted with the following solution:

100 g Tyzor AA
200 g iso-propanol (solvent grade)
312 g water

The Tyzor AA, the iso-propanol and the water were mixed to form a first solution. A final solution was formed by stirring in the polyethylene glycol.

S-glass fibers were immersed in the final solution for a period of fifteen minutes and then dried in an oven for 30 minutes at 300° F.

The results of treating S-glass fibers in this manner are shown in Example II.

EXAMPLE II

A series of S-glass fibers was treated in accordance with the above procedure and compared with a series of S-glass fibers not so treated.

Tests were then undertaken to determine the presence and amounts of crystalline phases. Treatments and results were as follows:

| Sample | Titanium Treatment | Heat Treatment @, °F. | Analysis* $MgAl_2$ | $Mg_2Al_4$ | Amor |
|---|---|---|---|---|---|
| 1 | Untreated | 1700 | 10 | n.d. | 80 |
| 2 | Untreated | 1900 | 100 | n.d. | 0 |
| 3 | Untreated | 2100 | t | 100 | 0 |
| 4 | Yes | 1700 | 50 | n.d. | 50 |
| 5 | Yes | 1900 | 60 | n.d. | 40 |
| 6 | Yes | 2100 | n.d. | 100 | 0 |

*$MgAl_2 = MgAl_2Si_4O_{12}$
$Mg_2Al_4 = Mg_2Al_4Si_5O_{18}$
Amor = Amorphous Materials
t = trace
n.d. = not detected
Estimated volume Percent of Each Phase by x-ray diffraction and optical microscopy

Conclusions

1. Samples 1, 2, 3, 4 and 5 contained trace to 100 volume percent $MgAl_2Si_4O_{12}$.
2. Samples 1, 4 and 5 contained 40 to 80 volume percent of amorphous materials.
3. Samples 3 and 6 contained 100 volume percent $Mg_2A_4Si_5O_{18}$ (cordierite)

The above data indicate that the titanium dioxide has a moderating effect on crystal growth once nucleation (seeding) has taken place in the fiber. The titanium dioxide allows for controlled formation of a glass-ceramic material at moderate temperatures.

Sample 1 (untreated) and sample 4 (treated), when both heated to 1700° F., form glass-ceramic but the treated sample is more ceramic. At 1900° F., sample 2 (untreated) is fully ceramic while sample 5 (untreated) is still about the same glass ceramic as was formed at 1700° F. The titanium dioxide forms glass-ceramic at lower temperature and stabilizes it over a broader temperature range.

The treated fibers have been found to retain their fiberous character as their temperature is raised to 2100° F. while the untreated fibers have been found to slump at that temperature and, ultimately, form a solid ball. Both materials eventually transform to cordierite at about 2100° F.

These data, therefore, indicate that titanium dioxide, in the absence of any refractory metal, has a significant effect on the formation and stabilization of glass-ceramic fibers from S-glass at a temperature of 1700° F.

It will be evident from the foregoing that various modifications can be made to this invention. Such, however, are considered within the scope of the invention.

We claim:

1. A method of treating S glass fibers which comprises depositing a metallic compound consisting essentially of a titanium-organo complex on the surface of the heat cleaned glass fibers to deposit up to about 15 weight percent titanium dioxide on the glass fibers after heat treating, and heat treating the glass fibers at a temperature within the range of from about 1700° to about 2100° F. for a period of up to about 3 hours to convert said titanium-organo complex to said titanium dioxide and to convert said glass to a stabilized glass ceramic material.

2. The method of claim 1 in which said titanium-organo complex is titanium-acetylacetonate-iso-propanolate and said complex is contained in a solution comprising iso-propanol.

3. The method of claim 2 in which said solution comprises polyethyleneglycol.

4. A glass fiber treated by the method of claim 1.

5. A glass fiber treated by the method of claim 1 and comprising from about 50 to about 60 volume percent $MgAl_2Si_4O_2$ and from about 40 to about 50 volume percent amorphous materials.

6. A glass fiber of claim 4 comprising about 100 volume percent $Ma_2Al_4Si_5O_{18}$.

7. The method of claim 1 wherein said glass is a fiber consisting essentially of a magnesia aluminosilicate glass.

* * * * *